United States Patent
Deardurff et al.

(10) Patent No.: US 10,723,123 B2
(45) Date of Patent: Jul. 28, 2020

(54) INK COMPOSITIONS

(71) Applicant: Hewlett-Packard Development Company, L.P., Fort Collins, CO (US)

(72) Inventors: Larrie Deardurff, Corvallis, OR (US); Jayprakash C. Bhatt, Corvallis, OR (US); Milton Neill Jackson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/308,842

(22) PCT Filed: Sep. 15, 2017

(86) PCT No.: PCT/US2017/051714
§ 371 (c)(1),
(2) Date: Dec. 11, 2018

(87) PCT Pub. No.: WO2018/067286
PCT Pub. Date: Apr. 12, 2018

(65) Prior Publication Data
US 2019/0249023 A1 Aug. 15, 2019

(30) Foreign Application Priority Data

Oct. 6, 2016 (WO) ................ PCT/US2016/055707
Oct. 6, 2016 (WO) ................ PCT/US2016/055725

(51) Int. Cl.
*B41J 2/01* (2006.01)
*C09D 11/102* (2014.01)
(Continued)

(52) U.S. Cl.
CPC .............. *B41J 2/01* (2013.01); *B41M 5/0023* (2013.01); *C09D 11/03* (2013.01); *C09D 11/033* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,734,403 A 3/1998 Suga et al.
6,332,919 B2 12/2001 Osumi et al.
(Continued)

FOREIGN PATENT DOCUMENTS

EP 1086997 3/2001
EP 2390287 11/2011
(Continued)

OTHER PUBLICATIONS

Oko et al., Aggregation of inkjet ink components by CA and Mg ions in relation to colorant pigment distribution in paper, Colloids and Surfaces A: Physicochemicai and engineering Aspects, ScienceDirect, vol. 456, pp. 92-99, 2014.
(Continued)

*Primary Examiner* — Manish S Shah
(74) *Attorney, Agent, or Firm* — Thorpe North & Western LLP

(57) ABSTRACT

The present disclosure is drawn to an ink composition including an aqueous liquid vehicle, from 2 wt % to 7 wt % self-dispersed pigment dispersed in the aqueous liquid vehicle, and from 0.5 wt % to 5 wt % acidic polymeric binder particles having an acid number from 30 to 200 and a particle size from 1 nm to 100 nm dispersed in the aqueous liquid vehicle. The ink composition can also include from 0.1 wt % to 0.75 wt % monovalent salt solubilized in the aqueous liquid vehicle. The self-dispersed pigment to monovalent salt weight ratio in the ink composition can be from 3:1 to 50:1, for example.

15 Claims, 2 Drawing Sheets

(51) Int. Cl.
*C09D 11/38* (2014.01)
*C09D 11/03* (2014.01)
*C09D 11/107* (2014.01)
*C09D 11/324* (2014.01)
*B41M 5/00* (2006.01)
*C09D 11/033* (2014.01)
*C09D 11/037* (2014.01)
*C09D 11/326* (2014.01)

(52) U.S. Cl.
CPC .......... *C09D 11/037* (2013.01); *C09D 11/102* (2013.01); *C09D 11/107* (2013.01); *C09D 11/324* (2013.01); *C09D 11/326* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 5/5227; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | |
|---|---|---|
| 6,521,034 B1 | 2/2003 | Osumi et al. |
| 6,899,754 B2 | 5/2005 | Yet et al. |
| 7,651,557 B2 | 1/2010 | Burns et al. |
| 8,491,114 B2 | 7/2013 | Ikoshi |
| 8,641,356 B2 | 2/2014 | Kyotani |
| 9,109,129 B2 | 8/2015 | Goto et al. |
| 9,120,942 B2 | 9/2015 | Kunimine et al. |
| 9,193,884 B2 | 11/2015 | Vasudevan et al. |
| 9,315,683 B2 | 4/2016 | Nagai et al. |
| 9,631,104 B2 | 4/2017 | Adamic |
| 2001/0020431 A1 | 9/2001 | Osumi et al. |
| 2003/0043245 A1 | 3/2003 | Yamashita et al. |
| 2003/0079643 A1* | 5/2003 | Tomioka ............. B41M 7/0018 106/31.27 |
| 2004/0179066 A1* | 9/2004 | Arita .................. C09D 11/30 347/54 |
| 2005/0020728 A1 | 1/2005 | Nagaswa |
| 2005/0027035 A1 | 2/2005 | Wang et al. |
| 2007/0299198 A1 | 12/2007 | Spinelli |
| 2008/0071007 A1 | 3/2008 | Spinelli |
| 2008/0275163 A1 | 11/2008 | Liu |
| 2009/0056588 A1 | 3/2009 | Jackson |
| 2010/0196602 A1* | 8/2010 | Koyano ............. B41J 2/14129 427/256 |
| 2011/0057986 A1* | 3/2011 | Ikoshi ............... B41J 2/2107 347/21 |
| 2012/0092598 A1 | 4/2012 | Kyrlidis et al. |
| 2012/0329921 A1* | 12/2012 | Vasudevan ......... C09D 11/324 524/104 |
| 2013/0027463 A1 | 1/2013 | Ogasawara et al. |
| 2014/0015695 A1 | 1/2014 | Okamura et al. |
| 2014/0028766 A1 | 1/2014 | Kunimine et al. |

FOREIGN PATENT DOCUMENTS

| | | |
|---|---|---|
| JP | 2013124270 | 6/2013 |
| WO | 2011115614 | 9/2011 |
| WO | 2015134026 | 9/2015 |
| WO | 2015158752 | 10/2015 |

OTHER PUBLICATIONS

International Search Report dated Dec. 28, 2017 for PCT/US2017/051714, Applicant Hewlett-Packard Development Company, L.P.

* cited by examiner

100 inkjetting an ink composition from a fluid container through an inkjet printing orifice onto a surface of a porous media substrate, wherein the ink composition comprises from 2 wt% to 7 wt% self-dispersed pigment dispersed in the aqueous liquid vehicle, from 0.5 wt% to 5 wt% acidic polymeric binder particles having an acid number from 30 to 200 and a particle size from 1 nm to 100 nm dispersed in the aqueous liquid vehicle, and from 0.1 wt% to 0.75 wt% monovalent salt solubilized in the aqueous liquid vehicle — 110

FIG. 1

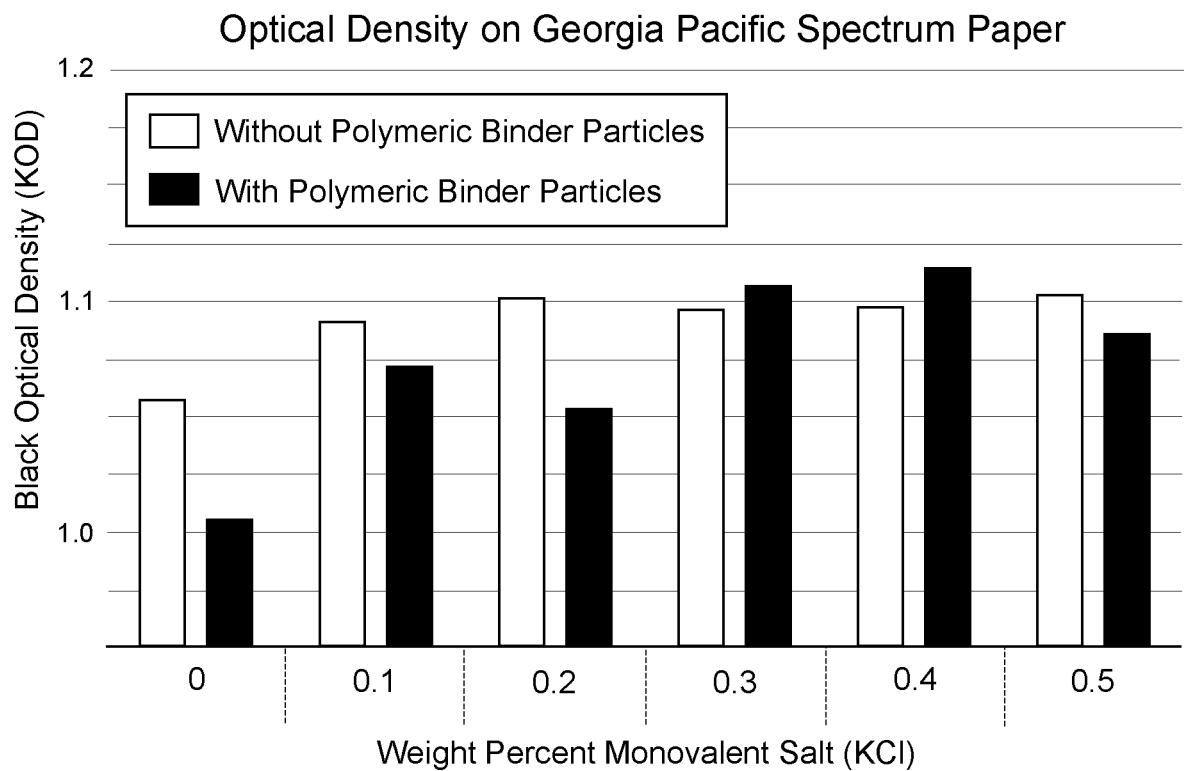

FIG. 2

INK COMPOSITIONS

BACKGROUND

Pigments can be dispersed or suspended in a liquid vehicle to be utilized in inks. A variety of pigments can be difficult to disperse and stabilize in water-based vehicles due to the nature of the surface of pigments and the self-assembling behavior of pigments. One way to facilitate color pigment dispersion and sustained suspension in a liquid vehicle is to adding a dispersant, such as a polymer, to the liquid vehicle. Another way to stabilize pigment is to covalently attach a small molecule, oligomer, or polymer to a surface of the pigment to form a self-dispersed pigment. Regardless of the technique of dispersion, the attached or unattached dispersant can stabilize the pigment in the liquid. Pigments that are otherwise stable in liquid vehicles can often penetrate print media, resulting in low color saturation or black optical density. Thus, enhancing color saturation or black optical density of ink compositions containing pigments would be a desirable property to achieve generally.

BRIEF DESCRIPTION OF THE DRAWINGS

Additional features and advantages of the disclosure will be apparent from the detailed description which follows, taken in conjunction with the accompanying drawings, together illustrating, by way of example, features of the present technology. It should be understood that the figures are representative of examples of the present disclosure and should not be considered as limiting the scope of the disclosure.

FIG. 1 is a flow diagram of an example method of printing in accordance with the present disclosure;

FIG. 2 is a graph diagram showing black optical density (KOD) of various ink compositions printed on a first type of porous media in accordance with the present disclosure;

DETAILED DESCRIPTION

Figure 3:
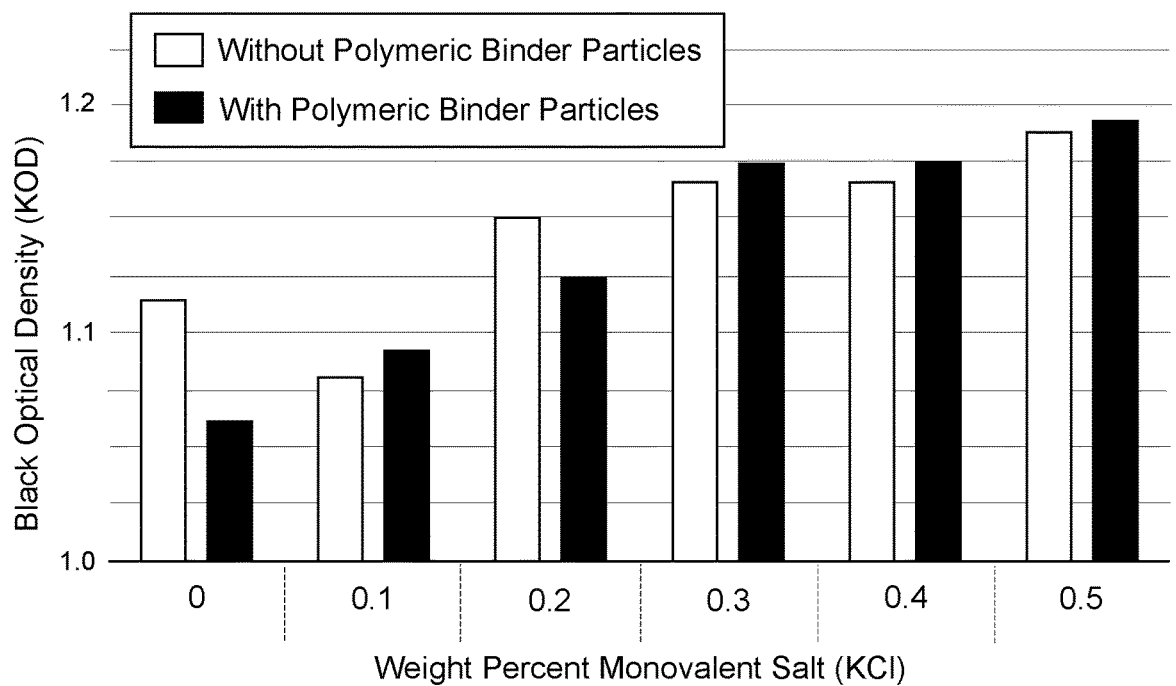
FIG. 3 is a graph diagram showing black optical density (KOD) of various ink compositions printed on a second type of porous media in accordance with the present disclosure.

The present disclosure is drawn to ink compositions and methods of printing. In accordance with the present disclosure, ink compositions with self-dispersed pigments can be printed on porous media with enhanced color saturation or black optical density. In many ink composition systems, color saturation or black optical density on porous media which do not included a special coating or treatment can be difficult to achieve because pigments that tend to be very stable in ink compositions (such as self-dispersed pigments) often penetrate the untreated porous media surface, thereby reducing the color saturation or black optical density. By adding a small amount of monovalent salt to the ink compositions, some destabilization can be introduced into the ink composition, which can improved color saturation or black optical density.

To understand pigment stability, two principal mechanisms of stabilization for self-dispersed pigments can be considered, namely steric stabilization (which can be introduced by surface-attached polymers and/or oligomers) and electrostatic stabilization (which is more related to the surface charge of the pigment). In the present disclosure, electrostatic stabilization can be particularly relevant to tuning the color saturation or black optical density, or more particularly, increase the color saturation or black optical density of pigment(s) when printed on plain paper or other porous media. Electrostatic stabilization occurs when the outer surface of the pigments becomes essentially equally charged (or charged at least enough to remain suspended) in the suspension fluid. The equal or near charge on the outer surface of individual pigments can result in a Coulomb-repulsion that prevents individual self-dispersed pigments from clumping together. The ink compositions and methods described herein provide for control of electrostatic stabilization of ink compositions by manipulating or adding a concentration of monovalent salt, thereby allowing for the enhancement of color saturation or black optical density of the ink compositions when printed on porous print media, even untreated porous media. In accordance with this, the addition of monovalent salt to a self-dispersed pigmented ink can attenuate electrostatic stabilization to some degree. By controlling the concentration of monovalent salt, e.g., adding just enough to keep the dispersed pigment electrostatically stable without adding too much to cause the pigment to crash, high color saturation or black optical density, even on porous media such as plain paper, can be achieved.

Furthermore, by adding polymeric binder particles which include acidic polar groups, the color saturation or black optical density can be essentially retained (or in some cases even improved), while adding improved print durability. Surprisingly, these same types of acidic polymeric binder particles are shown herein to fairly significantly reduce black optical density in particular when added to self-dispersed pigment ink compositions (without added monovalent salt in accordance with the present disclosure). However, when the monovalent salt is added to the ink composition along with the acidic polymeric binder particles described herein (which can include surface acid polar groups), surprisingly, the acidic polymeric binder particles do not significantly impact the black optical density gains (or color saturation gains) that are otherwise enhanced by the addition of the small concentration of monovalent salt.

In one example, the present disclosure is drawn to an ink composition which can include an aqueous liquid vehicle, from 2 wt % to 7 wt % self-dispersed pigment dispersed in the aqueous liquid vehicle, and from 0.5 wt % to 5 wt % acidic polymeric binder particles having an acid number from 30 to 200 and a particle size from 1 nm to 100 nm also dispersed in the aqueous liquid vehicle. The ink composition can also include from 0.1 wt % to 0.75 wt % monovalent salt solubilized in the aqueous liquid vehicle. The self-dispersed pigment to monovalent salt weight ratio in the ink composition can be from 3:1 to 50:1. In one specific example, the self-dispersed pigment to monovalent salt weight ratio in the ink composition can be from 4:1 to 15:1. In another example, the self-dispersed pigment can be an ionized carbon black pigment that is dispersed by surface charged acidic polar groups, and the ionized carbon black pigment in this example may not be further sterically stabilized by a covalently attached polymer or oligomer. Thus, the pigment is dispersed by charge stabilization and not significantly (if at all) by steric stabilization. Though any monovalent salt can be used, within these low concentrations, monovalent salts that are inorganic and have a molecular weight from 40 g/mol to 130 g/mol are particularly useful because of their ionic strength at these lower concentrations. In one specific example, the monovalent salt can be present in the ink composition at from 0.25 wt % to 0.6 wt %. In another example, the acidic polymeric binder particles can be, for example a polyurethane polymer, an acrylate polymer, a urethane polymer, or a combination thereof. Furthermore, the ink composition can also include lithium, introduced by any lithium source. Thus, in this example, the monovalent salt does not include lithium and the lithium can be included as a separate ingredient. The increase in color saturation or black optical density can also be related, in some instances, to the zeta potential of the ink. In one example, the zeta potential of the ink composition can be from −30 mV to −5 mV, and in another example, the zeta potential can be from −25 mV to −10 mV.

In another example, a method of printing can include inkjetting an ink composition from a fluid container through an inkjet printing orifice onto a surface of a porous media substrate. The ink composition can include from 2 wt % to 7 wt % self-dispersed pigment dispersed in the aqueous liquid vehicle, from 0.5 wt % to 5 wt % acidic polymeric binder particles having an acid number from 30 to 200 and a particle size from 1 nm to 100 nm dispersed in the aqueous liquid vehicle, and from 0.1 wt % to 0.75 wt % monovalent salt solubilized in the aqueous liquid vehicle. In one example, the porous media substrate can be an uncoated cellulose-based fibrous paper having a calcium chloride content of less than 2,500 μg/g of paper. In another example, the method can further include binding the self-dispersed pigment to the porous media substrate with the acidic polymeric binder particles. In another specific example, the method can further include crashing the self-dispersed pigment at the surface of the porous media substrate. In this example, the self-dispersed pigment can be charge stabilized while in the fluid container, and when the ink composition is printed on the porous media substrate, the aqueous liquid vehicle can be absorbed in the porous media substrate, thus increasing the ionic strength of the monovalent salt around the self-dispersed pigment. This can cause the self-dispersed pigment to crash at the surface of porous media substrate without contact with a separate crashing agent. The self-dispersed pigment can be an ionized carbon black pigment that is dispersed by surface charged acidic polar groups such that the ionized carbon black pigment is not further sterically stabilized by a covalently attached polymer or oligomer. The monovalent salt can be an inorganic monovalent salt having a molecular weight from 40 g/mol to 130 g/mol and can be present in the ink composition at from 0.25 wt % to 0.6 wt %. The ink composition can have a zeta potential from −30 mV to −5 mV.

In each of these examples, there can be four components that may be used in the present methodology, or which can be formulated together to generate ink compositions with improved color saturation/optical density and durability. These four ingredients can include, namely, the pigment, the dispersant attached to or modified onto the pigment surface, the acidic polymeric binder particles, and the monovalent salt. The ionic strength (measured as molar concentration) of the monovalent salt that provides improved saturation or optical density can depend on the pigment, attached dispersant, and/or acidic polymeric binder particles selected for use. A "crash point" of the pigment can be determined experimentally by trial and error, or can be determined using colloidal vibrational current techniques. Zeta potential data can also be used to estimate the crash point and to formulate ink compositions where the pigment remains stable in the ink composition, but where the pigment is near its crash point, e.g., typically when the zeta potential is approaching zero (0). Thus, a pigment crash point is not universal, but crash points can be readily determined as described herein, followed by formulating ink compositions, in one example, that include an ionic strength of monovalent salt that approaches the crash point for a particular self-dispersed pigment in a particular ink composition, but does not exceed the crash point. Both the monovalent salt concentration and the acidic polymeric binder particles, since they can both be ionic, can contribute to raising the zeta potential in the ink composition, so both can be added carefully so as to not cause the pigment to crash while part of a bulk dispersion, e.g., in an ink container. When the ink composition is printed on porous media, crashing may occur, and in many cases, crashing on the porous media after printing can lead to the improved color saturation or black optical density as described herein. Furthermore, even though the acidic polymeric binder particles include acid polar groups that contribute to less negative zeta potential (increasing from negative values to approaching zero), the addition of acidic polymeric binder particles alone actually tended to reduce color saturation or black optical density. On the other hand, when the both monovalent salt and the acidic polymeric binder particles are added together, color saturation or black optical density can be generally improved (over polymer alone) and in some instances, color saturation or black optical density enhancements that favorably compare to monovalent salt additions (alone) can be achieved. In other words, there appears to be some synergy occurring between the monovalent salt and the acidic polymeric binder particles that provide enhanced saturation/optical density, and furthermore, the acidic polymeric binder particles can enhance print durability at the same time.

In further detail regarding pigment crashing, pigments tend to crash when the stabilization forces, e.g., steric stabilization and/or electrostatic stabilization, particularly the electrostatic forces provided by surface-attached small molecule, oligomer or polymer, do not provide enough stabilization to keep the pigments separated in space enough to prevent adjacent pigments from crashing in on themselves. Thus, in the context of the present disclosure, "crash point" can be defined where a molar concentration (ionic strength) of a monovalent salt is just high enough that electrostatic stabilization provided by the attached dispersant is unable to prevent the pigment from crashing while present in a bulk dispersion, e.g., in an ink container. In other words, the crash point represents the molar concentration of the monovalent salt demarking the line between self-dispersed pigment stability and the self-dispersed pigment beginning to crash. Furthermore, in the context of the present ink compositions and related methods, the acidic polymeric binder particles can also contribute pigment destabilization. Thus, in one example, the crash point of a pigment in an ink composition can be determined experimentally, e.g., trial and error, by pigment colloidal vibrational current (CVI) techniques, or by considering the zeta potential of the ink composition. Ink compositions that are negative, but which are approaching zero (0) may be stable as a bulk dispersion, but if close enough to 0, may crash when printed on porous media. Example zeta potentials for some ink compositions that meet this criteria include ink compositions having a zeta potential from −30 to −5 or from −25 to −10. The use of zeta potential provides a measurement that takes into account the ink composition formulation as a whole, including both the monovalent salt and the acidic polymeric binder particles.

In accordance with this, by adding a monovalent salt at a concentration in an ink that brings the ionic strength (measured as the molar concentration of the added salt) just below the crash point, and taking into account the charge introduced by the acidic polymeric binder particles, when the ink composition is printed on a porous medium, such as plain paper, in one example, the aqueous liquid vehicle can absorb into the fibrous paper, thus increasing the molar concentration or ionic strength of the monovalent salt at the surface of the media. Because the ionic strength of the monovalent salt in combination ionic character of the acidic polymeric binder particles brings the pigment close to the crash point in the ink reservoir (prior to printing), once just a small portion of the aqueous liquid vehicle absorbs into the plain paper media, the pigment may crash at the surface of the paper. Thus, much of the self-dispersed pigment remains at the surface of the porous media when it crashes, and the color saturation or black optical density can be increased (compared to when no monovalent salt is added).

With specific reference to the pigment, the pigment is not particularly limited. The particular pigment used can depend on the colorists desires in creating the composition. Colored pigments can be measured for color saturation, and black pigments can be measured for optical density. Both can be referred to herein as "pigment colorants" or "colorants" or "pigments." Pigment colorants can include black, cyan, magenta, yellow, black, red, blue, orange, green, pink, etc., pigments. Regardless, in accordance with the present disclosure, the pigment can be a self-dispersed pigment having a surface modified with a small molecule, oligomer, or polymer. The small molecule, oligomer, or polymer attached to the surface can act to disperse pigments in an aqueous liquid vehicle with need to add additional dispersing polymers. Examples of surface modification groups can include benzene-sulfonic acids, carboxylic acids, phosphonic acids, etc. When attaching a polymer or an oligomer, some suitable acid monomers used to prepare the dispersant (for attachment) can include acrylic acid, methacrylic acid, carboxylic acid, sulfonic acid, phosphonic acid, etc. More generally, the dispersant used to attach to the pigment can vary based on the pigment; however, the attached dispersant typically include acid groups.

In further detail regarding surface modification of black pigments (and certain color pigments) with small molecules including acidic polar groups, these groups can be added to the surface through oxidation, for example, either during the preparation of the pigment per se, or through post manufacturing treatment. In further detail, by way of specific example, a pigment can be surface treated using light, ultra-violet radiation, or ozone treatment processes. In one example, the surface treatment can be carried out by exposing the black pigment to both light and ozone, resulting in small molecules being generated at the surface of the pigment. The surface treatment, regardless of the treatment method, can result in a pigment with an ionized surface, which can also be referred to generally as an "ionized pigment," or in the specific case of carbon black, as an "ionized carbon black pigment." Ionized pigments are one specific type of self-dispersed pigment which include small molecule ionic groups on the surface making them charged stabilized, but which do not typically include polymers or oligomers that would otherwise provide further steric stabilization. That being stated, pigments that are sterically stabilized by attached polymers and/or oligomers can also be charge stabilized as well.

With specific reference to the black pigment as an example, the ink composition can include a self-dispersed carbon black pigment. Essentially, carbon black pigments, such as lamp black, furnace black, or gas black type carbon black pigments can be surface modified to be dispersive in water. For example, by reacting a carbon black pigment surface with either a small molecule, or an oligomeric or polymeric material that is water soluble or dispersive in nature (e.g., p-aminobenzoic acid, acrylic based oligomers, polymers made of monomers such as acrylic or methacrylic acid and esters thereof, polyurethane oligomers or polymers, etc.), the carbon black pigment can be made to be self-dispersing. Thus, in one example, the surface can be modified to include small acid polar surface groups, and in another example, polymers and/or oligomers can be attached to the surface. Surface modification with small molecules, e.g., modify with acid polar group, can provide charge stabilization to the pigment. On the other hand, attaching polymers and/or oligomers can provide both steric stabilization and charge stabilization. Because of the steric stabilization provided by polymers and/or oligomers in particular (in addition to the charge stabilization), adding monovalent salts to partially destabilize the pigment in the bulk dispersion state and to generate crashing upon printing may be less predictable. Furthermore, steric stabilization may, to some extent, counteract some of the gains in optical density that can otherwise be achieved by the addition of the monovalent salt. On the other hand, pigments modified with small acidic polar groups are primarily stabilized by charge stabilization, and steric stabilization is not a factor. Thus, a strong correlation between the added monovalent salt and the self-dispersed pigment may be more readily ascertainable on an ink by ink basis. That being stated, either type of self-dispersed pigment can be used, even though there may be some advantages to using self-dispersed pigments that are not sterically stabilized.

Some suitable self-dispersed pigments, including ionized pigments and polymer/oligomer dispersed pigments are commercially available from E.I. du Pont de Nemours and Co. (Wilmington, Del.), Sensient Technologies Corporation (Milwaukee, Wis.), and Cabot Corporation (Boston, Mass.). In further detail, some organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof. These pigments can be modified to include a small molecule, oligomer, or polymer to form the self-dispersed pigments described herein. Examples of self-dispersed pigments can include: Cab-O-jet® 300K, Cab-O-jet® 400K, Cab-O-jet® 250C, Cab-O-jet® 2603C, Cab-O-jet® 450C, Cab-O-jet® 2604M, Cab-O-jet® 260M, Cab-O-jet® 4565M, Cab-O-jet® 460M, Cab-O-jet® 465M, Cab-O-jet® 470M, Cab-O-jet® 2605Y, Cab-O-jet® 470Y, Cab-O-jet® 270Y, or mixtures thereof. Cab-O-jet pigments are available from Cabot Corporation.

The self-dispersed pigment can be present in the ink composition at various concentrations. In one example, the carbon black pigment can be present from 2 wt % to about 7 wt %. In another example, the self-dispersed pigment can be present at from about 2 wt % to about 6 wt %. In another example, the self-dispersed pigment can be present at from about 2 wt % to about 5 wt %. In another example, the self-dispersed pigment can be present at from about 3 wt % to about 6 wt %. In another example, the self-dispersed pigment can be present at from about 3 wt % to about 5 wt %. In yet another example, the self-dispersed pigment can be present from about 4 wt % to about 5 wt %.

If desired, two or more self-dispersed pigments can be combined to create novel color compositions. In one example, a self-dispersed pigment combination can form a red ink by combining a magenta pigment and a yellow self-dispersed pigment, e.g. 50-60 wt % magenta self-dispersed pigment and 40-50 wt % yellow pigment. In another example, the self-dispersed pigment combination can form a green ink by combining a yellow self-dispersed pigment and a cyan self-dispersed pigment, e.g., 65-75 wt % yellow self-dispersed pigment and 25-35 wt % cyan self-dispersed pigment. In yet another example, the self-dispersed pigment combination can form a blue ink by combining cyan self-dispersed pigment and magenta self-dispersed pigment, e.g., 85-95 wt % cyan self-dispersed pigment and 5-15 wt % magenta self-dispersed pigment.

The self-dispersed pigments of the present disclosure can be from nanometers to a micron in size, e.g., 20 nm to 1 µm. In one example, the pigment can be from about 50 nm to about 500 nm in size. In another example, the pigment can be from about 50 nm to about 200 nm in size. In another example, the pigment can be from about 75 nm to about 300 nm in size. Pigment sizes outside this range can be used if the pigment can remain dispersed and provide adequate printing properties.

Turning now to the monovalent salt, any of a number of salts, including monovalent alkali metal salts, monovalent non-metallic salts, or combinations thereof, can be used. Examples of monovalent non-metallic salts can include monovalent quaternary ammonium salts [$NR^{+4}$], where R is an alkyl group or an aryl group, organic salts, e.g., $NH_4F$, $NH_4Cl$, $NH_4NO_3$, $(NH_4)_2SO_4$, and/or $(NH_4)_3PO_4$. Examples of monovalent alkali metal salts that can be used include LiF, NaF, KF, RbF, CsF, LiCl, KCl, NaCl, CsCl, RbCl, LiBr, CsBr, RbBr, KBr, NaBr, $NH_4Br$, Lit, NaI, KI, RbI, CsI, $NaNO_3$, $KNO_3$, $LiNO_3$, $RbNO_3$, $CsNO_3$, $KNO_3$, $Li_2SO_4$, $Na_2SO_4$, $K_2SO_4$, $Cs_2SO_4$, $Rb_2SO_4$, $Li_3PO_4$, $Na_3PO_4$, $K_3PO_4$, $Rb_3PO_4$, $Cs_3PO_4$, $Li_3PO_4$, monosodium citrate, disodium citrate, trisodium citrate, potassium citrate, rubidium citrate, cesium citrate, lithium citrate, sodium ascorbate, potassium ascorbate, lithium ascorbate, lithium acetate, sodium acetate, potassium acetate, cesium acetate, rubidium acetate, monosodium glutamate, and/or potassium glutamate. Essentially, any salt that includes a monovalent alkali metal cation or a monovalent non-metallic cation (ionically associated at one or more location to an anion) can be used.

Using only weight percentages to establish the monovalent salt concentration, in some cases, may not provide a detailed or specific enough range or concentration for each and every one of these monovalent salts that may be used. However, to establish generalized ranges, the salt can typically be present in the ink at from 0.1 wt % to 0.75 wt %, from 0.2 wt % to 0.6 wt %, from 0.25 wt % to 0.6 wt %, from 0.3 wt % to 0.5 wt %, or from 0.3 wt % to 0.4 wt %. These monovalent salt concentration ranges can take into account the added ionic charge introduced by the inclusion of the acidic polymeric binder particles described herein. These weight ranges are provided primarily for guidance and to emphasize that the range of salt used is typically low, but above at least a minimum threshold of 0.1 wt % to generate improved color saturation or black optical density. When combining specific self-dispersed pigments and specific monovalent salts, ionic strength based on molar concentration can be further used to provide more specific range information where color saturation may be improved further. For example, the molar concentration of the monovalent salt can be from 30% to 95% of the crash point, or from 50% to 90% of the crash point, or from 60% to 85% of the crash point. As mentioned previously, the "crash point" can be defined by a molar concentration of the monovalent salt where its ionic strength in the ink is just high enough that electrostatic stabilization provided by the attached dispersant is not strong enough to prevent the pigment from crashing. In accordance with this, depending on the self-dispersed pigment, monovalent salt, and acidic polymeric binder particles selected, the crash point of the pigment may be at a molar concentration of monovalent salt from 0.01 M to 0.15 M. In other more specific examples, for yellow pigment, the crash point may be at a molar concentration of monovalent salt of 0.01 M to 0.05 M or from 0.02 M to 0.04 M; for magenta ink, the crash point may be at a molar concentration of monovalent salt of 0.01 to 0.05 M or from 0.02 M to 0.04 M; for cyan ink, the crash point may be at a molar concentration of monovalent salt of 0.03 M to 0.1 M, or from 0.05 M to 0.08 M; and/or for black ink, the clash point may be at a molar concentration of monovalent salt of 0.01 to 1 M, for example. Ink compositions with mixtures of pigments used for other colors, e.g., Red, Blue, Green, Purple, Pink, Orange, etc., can be adjusted so that neither pigment reaches its crash point in one example.

One reason ionic strength can be used to ascertain a crash point rather than weight percentage has to do with the varying molecular weights of the monovalent salts that can be used. That being stated, a weight range from about 0.1 wt % to about 0.75 wt % for the monovalent salt concentration in the ink may be suitably broad enough to cover various self-dispersed pigment and monovalent salt concentrations that may be practical for use. This can be particularly the case when the monovalent salt has a low molecular weight, e.g., from 40 g/mol to 130 g/mol, and because the acidic polymeric binder particles are included in the ink composition as described herein. These lower weight monovalent salts can typically be inorganic salts of lithium, sodium, or potassium with chloride, bromide, or nitrate counterions, e.g., LiCl, LiBr, $LiNO_3$, NaCl, NaBr, $NaNO_3$, KCl, KBr, and/or $KNO_3$. Some alkali metal carbonates or alkali metal sulfites can also be used that fall within this lower molecular weight range.

In further detail, it is noted that weight percentage ranges for the monovalent salt, e.g., 0.1 wt % to 0.75 wt %, from 0.2 wt % to 0.6 wt %, from 0.25 wt % to 0.6 wt %, from 0.3 wt % to 0.5 wt %, from 0.3 wt % to 0.4, wt % etc., and ionic strength ranges, e.g., 0.01 M to 0.15 M, 0.01 M to 0.05 M, 0.02 M to 0.1 M, etc., can be combined together in any combination to provide a monovalent salt concentration profile that is desired for an ink composition to enhance color saturation or optical density. Again, when designing such an ink composition, the ionic strength of the monovalent salt may also be less than the crash point of the specific pigment/monovalent salt selected for use in the ink composition, e.g., from 30% to 95%, 50% to 90%, 60% to 85%, etc., of the ionic strength of the pigment crash point. Furthermore, pigment concentration ranges, e.g., 2 wt % to 7 wt %, 2 wt % to 6 wt %, 3 wt % to 5 wt %, etc., and/or pigment to monovalent salt ratio, e.g., 3:1 to 50:1, 4:1 to 45:1, 3:1 to 35:1, 4:1 to 20:1, 4:1 to 15:1, 5:1 to 15:1, etc., can also be combined together with any of the monovalent salt weight percentage ranges and/or the ionic strength ranges (in any combination) to provide an ink profile that improves color saturation or optical density.

In still further detail, acidic polymeric binder particles, e.g., acid number from 30 to 200, can also contribute to the stability of the self-dispersed pigment. Thus, a complete ink composition having a zeta potential of −30 mV to −5 mV, or from −25 mV to −10 mV, can be prepared that provides enough stability to the self-dispersed pigment to keep it from crashing in the bulk dispersion, and may allow it to crash when printed on porous media as the aqueous liquid vehicle is absorbed therein. For example, in ink compositions containing self-dispersed pigments and acidic polymeric binder particles as described herein, as monovalent salt content is increased, the zeta potential becomes less negative. As the zeta potential approaches zero (0) and the ink becomes more neutral, the pigment may begin to crash. Some pigments may crash at about 0, and others may begin to crash at about −10 mV, or −5 mV, for example. Thus, the entire system can be considered when formulating an ink composition in accordance with the present disclosure.

Turning now to the acidic polymeric binder particles, as mentioned, these particles can have an acid number from 30 to 200, indicating that there are acid groups present on the particles. Some specific suitable examples of acidic polymeric binder particles include polyurethane binders, acrylate binders, and/or the like. For example, a polyurethane binder can be used that has an acid number ranging from 30 to 90, and a weight average molecular weight ranging from 2,000 Mw to 200,000 Mw. In another example, the polyurethane binder has an acid number of 40 to 80 and a weight average molecular weight from 10,000 Mw to 50,000 Mw. In a specific example, the acid number can be about 55 and the weight average molecular weight can be about 18,000 Mw. In one example, in addition to water, the organic co-solvent used to disperse the polyurethane and amount of co-solvent used may depend, at least in part, upon concerns related to preparation of a subsequently formulated ink composition. As an example, the co-solvent may be selected in order to aid in dispersing the polyurethane binder throughout the ink composition. As another example, the amount of polyurethane binder used may have a deleterious effect on the decap performance in an ink composition, and thus, co-solvent(s) may be selected to counteract this deleterious effect. In other examples, these co-solvent can be added later in an ink composition liquid vehicle. In one example, when preparing a polyurethane dispersion, two co-solvents may be used, such as di-(2-hydroxyethyl)-5,5-dimethylhydantoin and 1-(2-hydroxyethyl)-2-pyrrolidinone, or any two other co-solvents that may provide desirable properties that are also effective for dispersing/preparing the polyurethane.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof. Thus, the acidic polymeric binder particle may also be an acrylate type polymer, such as a styrene acrylate polymer, a urethane acrylate polymer, etc. Without limitation, suitable acrylate polymers can include polymers having a molecular weight ranging from 2,000 Mw to 200,000 Mw, an acid number of from 30 to 180, for example. Some examples of suitable monomers include acrylic acid, methacrylic acid, esters of both acrylic acid and methacrylic acid, etc. Co-solvent choice used for preparing a subsequently formulated ink composition can be considered, though the co-solvent choice may or may not differ from the choices for the polyurethane binder.

The acidic polymeric binder particles can be prepared to have any of a number of different particle morphologies, provide the acidic polymeric binder particle include acid polar groups. For example, the polymer may be a homopolymer prepared from a single monomer. Alternatively, the acidic polymeric binder particles may be individual spherical particles containing polymer compositions of high Tg hydrophilic (hard) component(s) and/or low Tg hydrophobic (soft) component(s) that may be interdispersed according to IPN (interpenetrating networks), although it is contemplated that the high Tg hydrophilic and low Tg hydrophobic components may be inter-dispersed in other ways. For another example, the polymer particles may be made of a low Tg hydrophobic core surrounded by a continuous or discontinuous high Tg hydrophilic shell. For another example, the polymer particle morphology may resemble a raspberry, in which a low Tg hydrophobic core is surrounded by several smaller high Tg hydrophilic particles that are attached to the core. For still another example, the polymer particles may include 2, 3, or 4 particles that are at least partially attached to one another.

In examples herein, high Tg hydrophilic component(s)/shell/particles and low Tg hydrophilic component(s)/core/particles may be defined in relation to each other (e.g., the high Tg hydrophilic component(s)/shell/particles have a Tg higher than the low Tg hydrophilic component(s)/core/particles, and the low Tg hydrophilic component(s)/core/particles have a Tg lower than the high Tg hydrophilic component(s)/shell/particles). In some examples, the high Tg hydrophilic component(s)/shell/particles have a Tg higher than 25° C. In other examples, the high Tg hydrophilic component(s)/shell/particles have a Tg higher than 45° C. In some examples, the low Tg hydrophilic component(s)/core/particles have a Tg lower than 25° C. In other examples, the low Tg hydrophilic component(s)/core/particles can have a Tg lower than 5° C. In one example, with some of the acidic polymeric binder particles described herein, low Tg hydrophobic component(s) can make up from about 65% to about 100%, by weight, of the acidic polymeric binder particles, and the high Tg hydrophilic component(s) make up from about 0.1% to about 35%, by weight, of the acidic polymeric binder particles.

Copolymers may likewise include a more hydrophobic component and a more hydrophilic component. In these examples, the hydrophilic component renders the particles dispersible in the ink vehicle, while the hydrophobic component is capable of coalescing upon solvent evaporation to bind the pigment on a recording medium. Examples of low Tg monomers that may be used to form a hydrophobic component of a copolymer include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The copolymer can be formed of at least two of the previously listed monomers, or at least one of the previously listed monomers and a high Tg hydrophilic monomer, such as particularly an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high Tg hydrophilic monomers include acrylamide, methacrylamide, monohydroxylated monomers, monoethoxylated monomers, polyhydroxylated monomers, or polyethoxylated monomers.

Any suitable polymerization process may be used to form the polymeric binder of the present disclosure. For example, hydrophobic-hydrophilic polymer can be formed by any of a number of techniques, such as: i) attaching a high Tg hydrophilic polymer onto the surface of a low Tg hydrophobic polymer, ii) copolymerizing low Tg hydrophobic and high Tg hydrophilic monomers using ratios that lead to a more high Tg hydrophilic outer component or shell, iii) adding high Tg hydrophilic monomer (or excess high Tg hydrophilic monomer) toward the end of the copolymerization process so there is a higher concentration of high Tg hydrophilic monomer copolymerized at or near the surface, or iv) any other method known in the art to generate a more high Tg hydrophilic outer component or shell relative to the inner component or core. These hydrophobic-hydrophilic polymer particles may be core-shell particles. It is to be understood, however, that these techniques may also form polymer particles with other morphologies, as noted herein.

In one example, regardless of the structure of the acidic polymeric binder particles, there can be acid groups at the surface of the particles which can interact with the ink composition and influence the zeta potential thereof.

In further detail, the acidic polymeric binder particles can have an average particle size from 1 nm to 100 nm, from 2 nm to 75 nm, from 3 nm to 50 nm, from 5 nm to 50 nm, from 5 nm to 30 nm, from 10 nm to 100 nm, from 20 nm to 100 nm, or from 50 nm to 100 nm, for example. As used herein, "average" with respect to properties of particles refers to a number average unless otherwise specified. Accordingly, "average particle size" refers to a number average particle size. Additionally, "particle size" refers to the diameter of spherical particles or to the longest dimension of non-spherical particles.

In addition to the ink composition ingredients described herein, other ingredients can likewise be added to the aqueous liquid vehicle. For example, components can be added to assist with decap and/or decel performance, other aspects related to print quality, etc. For example, decap controlling additive(s) can be included in the ink compositions of the present disclosure. Improving "decap" performance can include increasing the amount of time an inkjet nozzle can remain uncapped between jetting events without clogging. Thus, certain decap controlling additive(s) can be used in forming a temporary "cap," which has the effect of maintaining the ability of an inkjet nozzle to fire a full volume drop after periods of varying delay between firing events. Thus, the term "decap" refers to this property. In accordance with this, certain components can cause the ink compositions described herein to form an anti-evaporative layer during uncapped, non-use, at an interface between the air and the ink composition at a print orifice of a nozzle. Thus, by slowing down water and other volatile solvent evaporation at this very small orifice, decap performance can be improved. To illustrate, in one example, one or more C10 to C20 fatty acid(s) and/or lithium can be added to the ink compositions of the present disclosure.

The C10 to C20 fatty acid can include a saturated fatty acid, an unsaturated fatty acid, a combination of multiple saturated fatty acids, a combination of multiple unsaturated fatty acids, or a combination of both an unsaturated and a saturated fatty acid. In one example, the fatty acid content (including any C10 to C20 fatty acid that may be present) can be from 0.1 wt % to 1 wt %. In one example, the saturated fatty acid can be present at from 0.09 to 0.9 wt % and an unsaturated fatty acid can be present at from 0.01 wt % to 0.1 wt %. In another example, the C10 to C20 fatty acid(s) can include oleic acid, linoleic acid, undecanoic acid, lauric acid, tridecanoic acid, or a combination thereof. More specifically, the ink composition can include from 0.09 wt % to 0.9 wt % lauric acid and from 0.01 wt % to 0.1 wt % oleic acid, or alternatively, from 0.1 wt % to 0.75 wt % lauric acid and from 0.02 wt % to 0.06 wt % oleic acid.

With respect to the added lithium, it is to be understood that the lithium can be present in the composition as an ion in solution, or as a lithium salt of the acid. Thus, the lithium can be added to the ink composition in the form of a salt, for example. The lithium content (elemental content) in the ink composition, regardless of the source used to introduce the lithium ion or lithium salt to the ink, can be from 0.00005 wt % to 0.5 wt %, from 0.0001 wt % to 0.3 wt %, from 0.0001 w % to 0.1 wt %, etc. When lithium is added as a decap controlling additive, it can be added in addition to the monovalent salt described herein. If, on the other hand, the lithium is added as a monovalent salt at from 0.1 wt % to 0.75 wt %, the lithium salt can act as the monovalent salt in accordance with examples of the present disclosure. Examples of lithium sources that can be used include lithium chloride, lithium bromide, lithium hydroxide, lithium counterion of a self-dispersed pigment, etc. In one example, the lithium and the C10 to C20 fatty acid(s) can be added together, e.g., lauric acid and oleic acid with lithium. In this example, the lithium can complex with the fatty acid(s) in the ink composition solution at the air/ink interface to further stabilize the arrangement of the fatty acid(s).

In order to formulate the self-dispersed pigment into an ink composition, the self-dispersed pigment may be combined with an aqueous liquid vehicle. The aqueous liquid vehicle is not particularly limited. The aqueous liquid vehicle can include polymers, solvents, surfactants, antibacterial agents, UV filters, other colorant, monovalent salts (as described in greater detail hereinafter) and/or other additives. However, as part of the ink composition, the self-dispersed pigment is included. In one example, along with other parameters used to determine the crash point and charge stabilization, etc., a lower self-dispersed pigment load may provide for the ability to be more flexible with other parameters, e.g., concentration of monovalent salt may be lowered with acceptable results. Furthermore, because the monovalent salt can generally increase the color saturation or black optical density of the ink composition, in some instances, a lower concentration of the self-dispersed pigment can be used, again leaving room in the ink composition for the addition of other types of ingredients or solids.

In further detail regarding the aqueous liquid vehicle, solvent(s) of the aqueous liquid vehicle can be any solvent or combination of solvents that is compatible with the components of the self-dispersed pigment. As the liquid vehicle is aqueous, water is one of the major solvents (present at more than 10 wt %, and often more than 30 wt %, or even more than 50 wt %), and usually, there is one or more organic co-solvent. In some examples, water may be present in an amount representing from about 20 wt % to about 90 wt %, or may be present in an amount representing from about 30 wt % to about 80 wt % of the total ink composition. If an organic co-solvent is added to prepare the self-dispersed pigment dispersion, that co-solvent can be considered when formulating the subsequent ink composition.

Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1,3-propane diol (EPHD), glycerol, N-methylpyrrolidone (NMP), dimethyl sulfoxide, sulfolane, glycol ethers, alkyldiols such as 1,2-hexanediol, and/or ethoxylated glycerols such as LEG-1, etc. The co-solvent can be present in the ink composition from 5 wt % to about 75 wt % of the total ink composition. In one example, the co-solvent can be present in the ink composition at about 10 wt % to about 50 wt %, or from about 15 wt % to 35 wt %.

The aqueous liquid vehicle can also include surfactant. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, fluorosurfactants and alcohol ethoxylated surfactants can be used as surfactants. In one example, the surfactant can be Tergitol™ TMN-6, which is available from Dow Chemical Corporation. The surfactant or combinations of surfactants, if present, can be included in the ink composition at from about 0.001 wt % to about 10 wt % and, in some examples, can be present at from about 0.001 wt % to about 5 wt % of the ink compositions. In other examples the surfactant or combinations of surfactants can be present at from about 0.01 wt % to about 3 wt % of the ink compositions.

Consistent with the formulations of the present disclosure, various other additives may be employed to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide® (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives known to those skilled in the art to modify properties of the ink as desired.

The ink compositions described above are particularly suited to provide good color saturation or black optical density on porous, non-specialized print media (even uncoated paper) but can be suitable for use on any type of porous print media; however, in one example, the substrate can be an uncoated cellulose-based fibrous paper. The reason these inks are particularly useful with porous plain paper is that color saturation is diminished fairly significantly as colorant and liquid vehicle becomes soaked into the fibrous paper beyond the surface. This problem is enhanced when the charge stabilization of the self-dispersed pigment is too high, e.g., the pigment is too stable to crash on the print media surface. Generally, pigment formulators tend to stabilize inks with high charges because they tend to perform well in the bulk dispersion, but as discussed herein, such high charge stabilization may not be the best choice for plain paper when trying to enhance saturation or optical density. Adding the right, relatively low, concentration of a monovalent salt as described herein can provide higher saturation as the self-dispersed pigment crashes on the paper when liquid vehicle becomes absorbed into the paper fibers. Furthermore, by including the acidic polymeric binder particles with acid polar groups thereon, durability can also be improved without significantly modifying the impact of the added monovalent salt in some examples.

Suitable examples of porous media substrates that can be used include, but are not limited to include, cellulose based paper, fiber based paper, inkjet paper, nonporous media, standard office paper, swellable media, microporous media, photobase media, offset media, coated media, uncoated media, fabrics, and woven substrate. Though the ink compositions of the present disclosure may work on these and other types of porous media substrates, treated or coated media tend not need the assistance of the ink compositions of the present disclosure to provide high optical density or color saturation thereof. This may be because the coating or treatment itself can contribute to the improved optical density or color saturation. Thus, in one example, the ink compositions of the present disclosure can be used and work surprisingly well on plain paper substrates, such as uncoated cellulose-based fibrous paper, and particularly papers having a calcium chloride content of less than 2,500 µg/g of paper. Papers that may be certified as ColorLok® media, as certified by HP, Inc., tend to have a calcium chloride content that is much higher than 2,500 µg/g of paper. Thus, even non-ColorLok papers can work well in accordance with examples of the present disclosure.

The ink compositions of the present disclosure can be related to methods of printing as well. As shown in FIG. 1, a method 100 of printing can include inkjetting 110 an ink composition from a fluid container through an inkjet printing orifice onto a surface of a porous media substrate. The ink composition can include from 2 wt % to 7 wt % self-dispersed pigment dispersed in the aqueous liquid vehicle, from 0.5 wt % to 5 wt % acidic polymeric binder particles having an acid number from 30 to 200 and a particle size from 1 nm to 100 nm dispersed in the aqueous liquid vehicle, and from 0.1 wt % to 0.75 wt % monovalent salt solubilized in the aqueous liquid vehicle. In one example, the porous media substrate can be an uncoated cellulose-based fibrous paper having a calcium chloride content of less than 2,500 µg/g of paper. In another example, the method can further include binding the self-dispersed pigment to the porous media substrate with the acidic polymeric binder particles. In another specific example, the method can further include crashing the self-dispersed pigment at the surface of the porous media substrate. In this example, the self-dispersed pigment can be charge stabilized while in the fluid container, and when the ink composition is printed on the porous media substrate, the aqueous liquid vehicle can be absorbed in the porous media substrate, thus increasing the ionic strength of the monovalent salt around the self-dispersed pigment. This can cause the self-dispersed pigment to crash at the surface of porous media substrate without contact with a separate crashing agent. The self-dispersed pigment can be an ionized carbon black pigment that is dispersed by surface charged acidic polar groups such that the ionized carbon black pigment is not further sterically stabilized by a covalently attached polymer or oligomer. The monovalent salt can be an inorganic monovalent salt having a molecular weight from 40 g/mol to 130 g/mol and can be present in the ink composition at from 0.25 wt % to 0.6 wt %. The ink composition can have a zeta potential from −30 mV to −5 mV.

It is noted that, as used in this specification and the appended claims, the singular forms "a," "an," and "the" include plural referents unless the content clearly dictates otherwise.

As used herein "aqueous liquid vehicle" or "liquid vehicle" refers to a water-containing liquid medium in which the self-dispersed pigment, and monovalent salt are admixed in to form an ink composition. In addition to water, the aqueous liquid vehicle can include several components including but not limited to organic co-solvents, surfactants, biocides, UN filters, preservatives, and other additives.

The term "self-dispersed pigment" includes pigments that have a small molecule, oligomer, or polymer covalently attached to the surface thereof, and does not include pigments with polymer associated therewith, e.g., adsorbed, attracted, etc. The small molecule type of self-dispersed pigment can be prepared, for example, by modifying the pigment or surface of the pigment or by affirmatively attaching a small molecule to the surface thereof. These self-dispersed pigments can be referred to as "ionized pigments" and often are stabilized primarily by charge stabilization rather than steric stabilization. The oligomer or polymer type of self-dispersed pigment can be prepared by attaching an oligomer or polymer to the surface, or by generating the polymer at the surface of the pigment, for example. These type of self-dispersed pigments are often stabilized by charge stabilization and steric stabilization. Often with these type of pigments, even when the charge is neutralized, they can still remain stable due to the steric stabilization properties.

Color "saturation" refers to the intensity of color, expressed by the degree from which it differs from white. It can be expressed as C/L*. Notably, saturation relates to color. However, in accordance with examples of the present disclosure, when a black self-dispersed pigment is used, "optical density" (OD) rather than color saturation can be used to describe the increased intensity. Thus, examples and discussion herein related to color saturation may also be relevant to black optical density, and vice versa. Any disclosure related to color saturation should be read to include black optical density (for black inks), and vice versa, whether explicitly stated so in a specific context or not.

Converting molar concentration to weight percent includes taking into account the molecular weight of the monovalent salt and the density of the liquid ink. Typically, the density of the ink can be from about 1.04 g/cm$^3$ to about 1.12 g/cm$^3$, or from about 1.06 g/cm$^3$ to about 1.10 g/cm$^3$, or so, depending on the ink formulation.

Notably, there may be some added ingredients that may include some incidental concentrations of monovalent salt that are inherently in the formulation of the additive. This monovalent salt is not calculated when determining the molar concentration of the added monovalent salt unless the salt that is already present in an additive is identical to the salt being added to increase the ionic strength. For example, a typical ink composition may inherently include very little monovalent salt brought in with certain added ingredients (sometimes as impurities or for other reasons in small amount), and may typically be present at concentrations less than about 200 ppm. The low end of the monovalent salt addition range described herein is 0.1 wt %, or 1,000 ppm, so this amount of inherently present monovalent salt often tends to be negligible and can be essentially ignored when formulating.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

When referring to an increase or improvement in performance, the increase or improvement is based on printing using Staples Office Copy Paper as the print medium, which was available at the time of filing of the disclosure in the United States Patent and Trademark Office.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be certain acceptable examples.

Example 1—Preparation of Ink Compositions

Twelve (12) black ink compositions were prepared in accordance with Table 1 below. All twelve inks used the same self-dispersed pigment (ionized carbon black pigment) and liquid vehicle components at the indicated concentrations. However, six inks were prepared without the acidic polymeric binder particles (polyurethane) and six inks were prepared with a small concentration of the acidic polymeric binder particles. Five samples from each type of ink (five with polyurethane and five without polyurethane) were further modified with the addition of incrementally increasing concentrations of potassium chloride, ranging from 0.1 wt % to 0.5 wt %, namely 0 wt %, 0.1 wt %, 0.2 wt %, 0.3 wt %, 0.4 wt %, and 0.5 wt %. Thus, the weight ratio of the self-dispersed pigment to monovalent salt content for ink compositions with added monovalent salt ranged from 8:8:1 (with 4.4 wt % self-dispersed pigment and 0.5 wt % monovalent salt) to 44:1 (with 4.4 wt % self-dispersed pigment and 0.1 wt % monovalent salt). Additionally, one sample from each group remained as formulated without the addition monovalent salt. With the varying concentrations of potassium chloride, the self-dispersed pigment and solvent concentrations were held constant. The general formulation used to prepare these inks is shown in Table 1, as follows:

TABLE 1

| Ingredient | Class | Weight % |
|---|---|---|
| Ink Compositions | | |
| [1]Dantocol DHE | Organic Co-solvent | 9 |
| 2-Pyrrolidone | Organic Co-solvent | 12.5 |
| [2]Surfynol 465 | Surfactant | 0.2 |
| [3]Acticide B20 | Biocide | 0.2 |
| Lithium Hydroxide | Decap Controlling Additive | 0.00012 |
| Oleic Acid | Decap Controlling Additive | 0.7 |
| Potassium Chloride | Monovalent Salt | 0 to 0.5 |
| [4]Polyurethane Binder | Acidic Polymeric Binder Particles | 0 or 0.12 |
| Self-dispersed Carbon Black Pigment | Colorant | 4.4 |
| Water | Solvent | Balance |

[1]available from Lonza, Inc., Allendale, New Jersey;
[2]available from Air Products and Chemicals Inc., Pennsylvania;
[3]available from Thor Specialties Inc., Connecticut; and
[4]Average Particle Size = ~5 nm to 10 nm; Acid Number = ~55.

Example 2—Black Optical Density

Each of the twelve (12) inks prepared in accordance with Example 1 was printed on two types of uncoated cellulose-based fibrous paper (non-ColorLok® media) at 60 ng/300$^{th}$, and then measured for black optical density. Generally, it was found that as the potassium chloride concentration was increased within a relatively low concentration range from 0.1 w % to 0.5 wt % (e.g., weight ratio of self-dispersed pigment to monovalent salt from 8.8:1 to 44:1), the optical density of the black ink generally increased, with just two exceptions, but still the trend remained upward. In other words, this data demonstrates how salt addition in relatively small concentrations improved optical density while keeping the bulk dispersion of the ink composition stable enough so that the pigment did not crash in the ink container. The best results were achieved at from 0.3 wt % to 0.5 wt % monovalent salt (e.g., weight ratio of self-dispersed pigment to monovalent salt from 8.8:1 to 14.66:1), with similar results expected to be achievable in this example by adding up to about 0.75 wt % monovalent salt (e.g., weight ratio of self-dispersed pigment to monovalent salt from about 5.86:1 to 14.66:1). Furthermore, without added monovalent, the polyurethane (acidic polymeric binder particles) had a generally negative impact on optical density. Thus, even though the acidic polymeric binder particles had a negative impact on optical density along, surprisingly, when included in conjunction with the monovalent salt, the improvements in optical density were not significantly impacted, and in some cases, the optical density even improved. The data related to this study is provided numerically in Tables 2 and 3, as well as graphically in FIGS. 2 and 3, respectively.

TABLE 2

Optical Density on Georgia Pacific Spectrum Paper (GP)

| Ink Sample | Monovalent Salt Concentration (KCl Wt %) | KOD Without Acidic Polymeric Binder Particles | KOD With Acidic Polymeric Binder Particles |
|---|---|---|---|
| 1 | 0 | 1.057 | 1.006 |
| 2 | 0.1 | 1.092 | 1.072 |
| 3 | 0.2 | 1.102 | 1.054 |
| 4 | 0.3 | 1.096 | 1.106 |
| 5 | 0.4 | 1.097 | 1.116 |
| 6 | 0.5 | 1.103 | 1.085 |

TABLE 3

Optical Density on Hammermill Great White 30% Recycled Paper (GW30)

| Ink Sample | Monovalent Salt Concentration (KCl Wt %) | KOD Without Acidic Polymeric Binder Particles | KOD With Acidic Polymeric Binder particles |
|---|---|---|---|
| 1 | 0 | 1.115 | 1.059 |
| 2 | 0.1 | 1.080 | 1.092 |
| 3 | 0.2 | 1.150 | 1.124 |
| 4 | 0.3 | 1.166 | 1.173 |
| 5 | 0.4 | 1.165 | 1.174 |
| 6 | 0.5 | 1.186 | 1.192 |

As can be seen from Tables 2 and 3 above, as well as FIGS. 2 and 3, respectively, the optical density for black inks with electrostatically dispersed pigments (ionized carbon black pigment) can be increased on various types of porous media by adding small concentrations of monovalent salt, e.g. potassium chloride in this example. Likewise, the data indicated that by adding acidic polymeric binder particles, e.g., polyurethane particles, alone (without adding monovalent salt), the optical density is fairly significantly reduced, e.g., reduced by 0.051 on GP and by 0.056 on GW30. Surprisingly, similar drops in optical density were not present when the same acidic polymeric binder particles were added to inks with the added monovalent salt. In fact, the gap or difference (A) between the generally improved black optical density that was realized by adding monovalent salt compared to the same inks which also included the polyurethane was reduced in every instance. Furthermore, in some instances, the presence of the polyurethane polymeric binder actually further improved the optical density. Thus, even though the acidic polymeric binder particles added alone were initially shown to significantly diminish black optical density, when combined with monovalent salt at appropriate concentrations, the acidic polymeric binder particles did not have as significant of a negative impact on the optical density, and in some instances, had very little or even an improved impact on optical density.

Example 3—Zeta Potential

Figure 4:
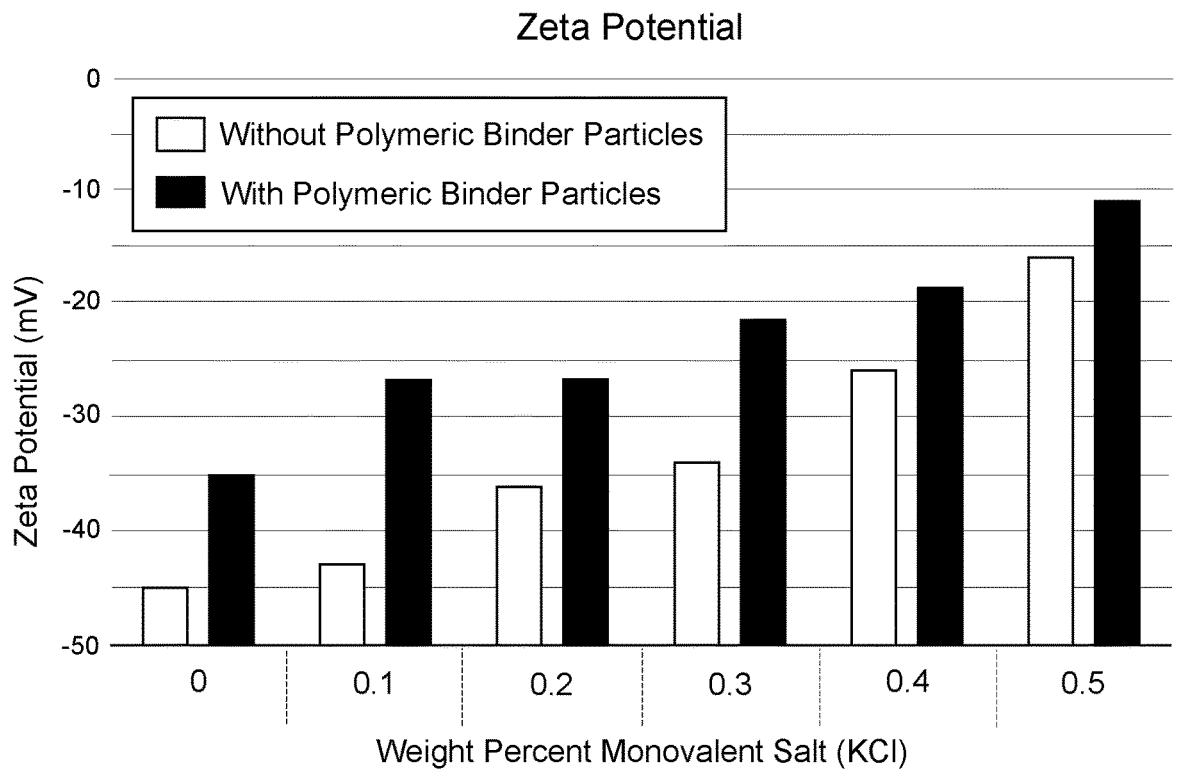
FIG. 4 is a graph diagram showing ink composition zeta potential of various ink compositions prepared in accordance with the present disclosure.

The twelve (12) ink compositions prepared in accordance with Example 1 were tested for Zeta potential to assess the effect of the monovalent salt on charge stability of the self-dispersed pigment in the various ink compositions. Generally, as the Zeta potential increases (becoming less negative) and approaching zero (0), the charge stabilization of the self-dispersed pigment decreases. The Zeta potential data is shown in Table 4 below and in FIG. 4.

By comparing the Zeta potential data to the optical density data described in Example 2, a general trend of increased (less negative) Zeta potential often relates to improved optical density (when comparing ink compositions with similar ingredients). For example, the correlation of Zeta potential and optical density is not always a direct correlation. For example, when the acidic polymeric binder particles are added to the ink composition, the Zeta potential does become less negative, but in some instances, the optical density decreases. This is likely due to the fact that the acidic polymeric binder particles may interact with the self-dispersed pigment in a stabilizing manner, thus sometimes slightly diminishing optical density improvements generated by the monovalent salt. In examples of the present disclosure, when formulating an ink composition with both monovalent salt and acidic polymeric binder particles, consideration of the monovalent salt concentration along with the Zeta potential data can provide some predictability related to optical density improvement. In other words, the Zeta potential data can be useful in predicting saturation or optical density improvement when comparing ink compositions that include both monovalent salt and the same acidic polymeric binder, and not so much when comparing an ink with acidic polymeric binder particles and another ink without (which may be due in part to the interaction of the acidic polymeric binder particles with pigment, for example). In examples of the present disclosure, ink compositions with self-dispersed pigment, acidic polymeric binder particles, and monovalent salt having a zeta potential range of −30 mV to −5 mV, or from −25 mV to −10 mV, can provide desirable optical density.

TABLE 4

| | Zeta Potential | | |
|---|---|---|---|
| Ink Sample | Monovalent Salt Concentration (KCl Wt %) | Zeta Potential (mV) Without Acidic Polymeric Binder Particles | Zeta Potential (mV) With Acidic Polymeric Binder Particles |
| 1 | 0 | −45 | −35 |
| 2 | 0.1 | −43 | −27 |
| 3 | 0.2 | −36 | −27 |
| 4 | 0.3 | −34 | −22 |
| 5 | 0.4 | −26 | −19 |
| 6 | 0.5 | −16 | −11 |

Example 4—Self-Dispersed Pigments and Monovalent Salt Weight Ratios

Three self-dispersed pigments were formulated into ink compositions with Cyan (Cabo-O-Jet® 450C from Cabot Corp.), Magenta (Cabo-O-Jet® 465M from Cabot Corp.), and Yellow (Cab-O-Jet® 470Y from Cabot Corp.). These inkjet ink compositions were further modified with the addition of different concentrations of monovalent salt, namely sodium nitrate ($NaNO_3$) salt. Specifically, each ink color was prepared at 0 wt % salt, 0.375 wt % (about 0.05 M) salt, and 0.75 wt % (about 0.1 M) salt. These ink composition samples did not include acidic polymeric binder particles, but rather were prepared to more directly compare weight ratios of self-dispersed pigments relative to monovalent salt addition. Thus, in this example, nine (9) ink samples were prepared from three colors and three salt concentrations. With the varying concentrations of sodium nitrate, the self-dispersed pigment and solvent concentrations were held constant. The formulation for each of the inks is shown below in Table 5, as follows:

TABLE 5

| Ink Compositions with Incrementally Increased $NaNO_3$ Salt Concentration | | |
|---|---|---|
| Ingredient | Class | Weight % |
| 2-hyroxylmethyl-2-pyrrolidinone | Solvent | 6 |
| Sulfolane | Solvent | 6 |
| Sorbitol | Solvent | 20 |
| Sodium Nitrate | Salt | 0, 0.375, or 0.75 |
| Self-dispersed Pigment | Colorant | 3 or 3.5 |
| Water | | Balance |

Note that the Cyan self-dispersed pigment was at 3.0 wt %, the Magenta self-dispersed pigment was at 3.5 wt %, and the Yellow self-dispersed pigment was at 3.5 wt.

Example 5—Color Saturation

Each of the nine (9) inks prepared in accordance with Example 4 was printed as a primary color (CMY) on plain paper at 600 ng/300th, and then measured for color saturation. These three primary inks were also printed as two (2) ink mixtures to generate secondary colors, namely Red (R), Green (G), and Blue (B). Generally, it was found that as the sodium nitrate concentration was increased within a relatively low concentration range from 0 w % to 0.375 wt % (about 0.05 M) and then to 0.75 wt % (about 0.1 M), the saturation (C/L*) generally increased. In other words, this data demonstrates how salt addition in relatively small concentrations can improve color saturation. The data is provided numerically in Table 6.

TABLE 6

Color Saturation on Staples Office Copy Paper

| Wt % Salt | Weight Ratio (Pigment:Salt) (CMY) | Saturation at 60 ng/300th | | |
|---|---|---|---|---|
| | | Cyan (C) | Magenta (M) | Yellow (Y) |
| 0 | — | 0.76 | 0.85 | 0.901 |
| 0.375 | 9.33:1 (C) 8:1 (MY) | 0.877 | 1.091 | 1.01 |
| 0.75 | 4:66:1 (C) 4:1 (MY) | — | 1.128 | 0.966 |

Note—There is no data for Cyan because at this concentration of monovalent salt, the Cyan ink may have started to crash (as evidenced by nozzle health compromise).

As can be seen, the trend of saturation can increase as the salt concentration increases, but at some concentration, the crash point may be reached and the self-dispersed pigment may not remain stable in the ink (which may be at about 0.75 wt % for this particular cyan ink). In some examples, by adding acidic polymeric binder particles to the ink formulation, the zeta potential can become less negative, and additional binding properties can be realized. In other examples, by slightly reducing the concentration of monovalent salt and adding an acidic polymeric binder particles, an ink like the cyan ink may be formulated to not crash while modifying the zeta potential accordingly to provide a saturated printed sample that does not crash in the bulk container, but which may crash upon printing. As noted, the weight ratio of self-dispersed pigment to monovalent salt in this example is as low as about 4:1, providing good saturation values for magenta and yellow inks (compared to no added monovalent salt).

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An ink composition, comprising:
an aqueous liquid vehicle;
from 2 wt % to 7 wt % self-dispersed pigment dispersed in the aqueous liquid vehicle;
from 0.5 wt % to 5 wt % acidic polymeric binder particles having an acid number from 30 to 200 and a particle size from 1 nm to 100 nm dispersed in the aqueous liquid vehicle; and
from 0.1 wt % to 0.75 wt % monovalent salt solubilized in the aqueous liquid vehicle,
wherein the self-dispersed pigment to monovalent salt weight ratio in the ink composition is from 3:1 to 50:1.

2. The ink composition of claim 1, wherein the self-dispersed pigment to monovalent salt weight ratio in the ink composition is from 4:1 to 15:1.

3. The ink composition of claim 1, wherein the self-dispersed pigment is an ionized carbon black pigment that is dispersed by surface charged acidic polar groups, wherein the ionized carbon black pigment is not further sterically stabilized by a covalently attached polymer or oligomer.

4. The ink composition of claim 1, wherein the monovalent salt is an inorganic monovalent salt having a molecular weight from 40 g/mol to 130 g/mol.

5. The ink composition of claim 1, wherein the monovalent salt is present in the ink composition at from 0.25 wt % to 0.6 wt %.

6. The ink composition of claim 1, wherein the acidic polymeric binder particles comprise a polyurethane polymer, an acrylate polymer, a urethane polymer, or a combination thereof.

7. The ink composition of claim 1, wherein the monovalent salt is not a lithium salt, and wherein the ink composition further comprises lithium.

8. The ink composition of claim 1, wherein the ink composition has a zeta potential from −30 mV to −5 mV.

9. The ink composition of claim 1, wherein the ink composition has a zeta potential from −25 mV to −10 mV.

10. A method of printing, comprising inkjetting an ink composition from a fluid container through an inkjet printing orifice onto a surface of a porous media substrate, wherein the ink composition comprises from 2 wt % to 7 wt % self-dispersed pigment dispersed in the aqueous liquid vehicle, from 0.5 wt % to 5 wt % acidic polymeric binder particles having an acid number from 30 to 200 and a particle size from 1 nm to 100 nm dispersed in the aqueous liquid vehicle, and from 0.1 wt % to 0.75 wt % monovalent salt solubilized in the aqueous liquid vehicle.

11. The method of claim 10, wherein the porous media substrate is an uncoated cellulose-based fibrous paper having a calcium chloride content of less than 2,500 µg/g of paper.

12. The method of claim 10, further comprising crashing and binding the self-dispersed pigment at the surface of the porous media substrate, wherein the self-dispersed pigment is charge stabilized while in the fluid container, and when the ink composition is printed on the porous media substrate, the aqueous liquid vehicle is absorbed in the porous media substrate thus increasing the ionic strength of the monovalent salt around the self-dispersed pigment and causing the self-dispersed pigment to crash at the surface of the porous media substrate without contact with a separate crashing agent.

13. The method of claim 10, wherein the self-dispersed pigment is an ionized carbon black pigment that is dispersed by surface charged acidic polar groups, wherein the ionized carbon black pigment is not further sterically stabilized by a covalently attached polymer or oligomer.

14. The method of claim 10, wherein the monovalent salt is an inorganic monovalent salt having a molecular weight from 40 g/mol to 130 g/mol and is present in the ink composition at from 0.25 wt % to 0.6 wt %.

15. The method of claim 10, wherein the ink composition has a zeta potential from −30 mV to −5 mV.

* * * * *